United States Patent [19]

Milburn, Jr.

[11] 4,147,300
[45] Apr. 3, 1979

[54] METHOD AND STRUCTURE FOR SOLAR HEATING

[75] Inventor: William W. Milburn, Jr., Boulder, Colo.

[73] Assignee: Thomas W. O'Rourke, Boulder, Colo.

[21] Appl. No.: 748,588

[22] Filed: Dec. 8, 1976

[51] Int. Cl.² ............................................... F24J 3/02
[52] U.S. Cl. .................................. 237/1 A; 126/270; 126/400
[58] Field of Search .................. 126/270, 271, 400; 237/1 A, 2 B; 165/49, 169, 104 S, 18

[56] References Cited

U.S. PATENT DOCUMENTS

| | | | |
|---|---|---|---|
| 2,559,869 | 7/1951 | Gay | 237/1 A |
| 2,868,010 | 1/1959 | Murphy | 98/31 |
| 3,190,816 | 6/1965 | Adamec | 126/271 |
| 3,243,117 | 3/1966 | Morgan | 126/270 |
| 3,832,992 | 9/1974 | Trombe et al. | 237/1 A |
| 3,927,659 | 12/1975 | Blake et al. | 126/271 |
| 3,955,555 | 5/1976 | Bostrom | 126/270 |
| 4,010,731 | 3/1977 | Harrison | 126/271 |
| 4,015,585 | 4/1977 | Fattor | 237/1 A |
| 4,016,861 | 4/1977 | Taylor | 126/270 |
| 4,033,324 | 7/1977 | Eckels | 126/271 |
| 4,037,583 | 7/1977 | Bakun et al. | 126/271 |
| 4,069,809 | 1/1978 | Strand | 126/270 |

FOREIGN PATENT DOCUMENTS 2303250  1/1976  France .......................... 126/270

Primary Examiner—Henry C. Yuen
Attorney, Agent, or Firm—O'Rourke & Harris

[57] ABSTRACT

A method and structure for utilizing solar energy for heating utilizing a wall of masonry or other cementitious material having preferably vertical channels defined through the central portion thereof. An outer surface, preferably spaced from the wall, is provided with a radiant energy absorbing surface, and transparent or translucent panels are positioned adjacent to but spaced from the wall and outer surface. Inlets and outlets to the channels within the wall are defined in the lower inner and outer surfaces of the wall respectively, and outlets and inlets to such channels are defined at the upper inner and outer surfaces of the wall respectively. The inner outlets communicate with an air distribution system and the inner inlets serve as return air ducts. The outer outlets and inlets serve to convect heat from the radiant energy absorbing surface. Preferably, the inner surface of the wall is insulated and, optionally, heat flow paths, preferably of metal, extend through the central portion of the wall including the channels. In particularly advantageous embodiments, supplemental heating means are provided in the heat distribution system. A heat pump may be employed to withdraw heat from the wall thereby greatly extending the amount of available heat energy stored in the wall.

16 Claims, 5 Drawing Figures

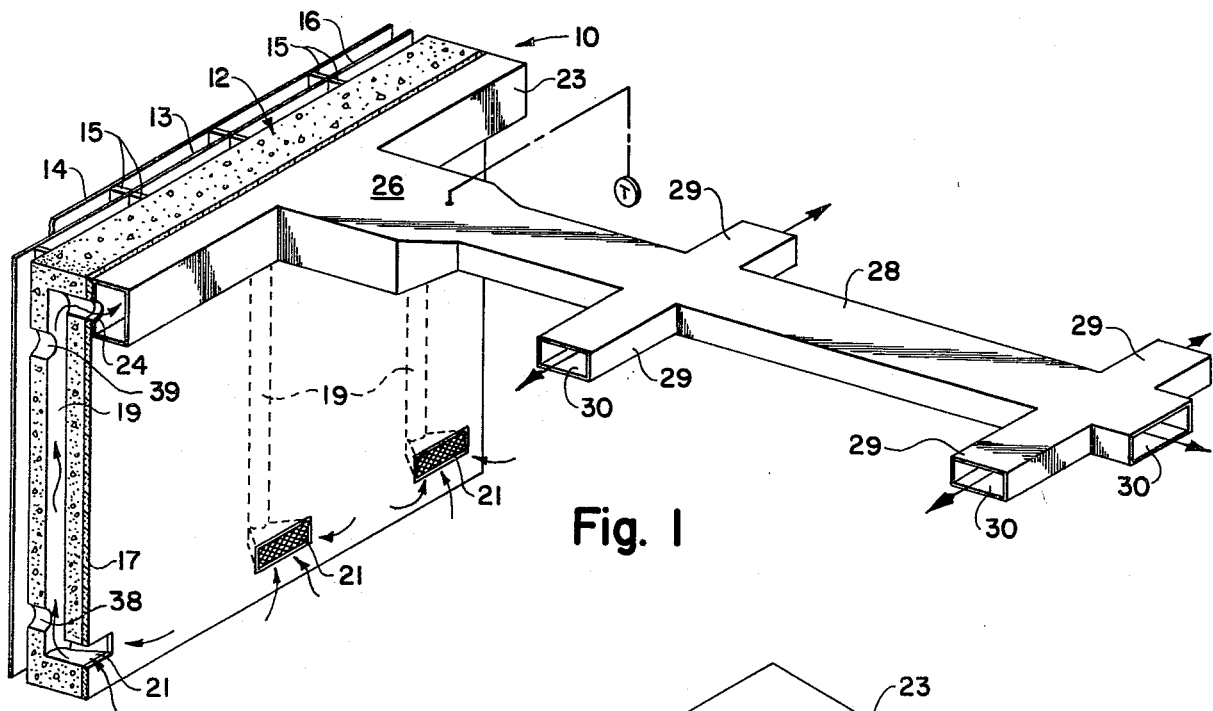
Fig. 1
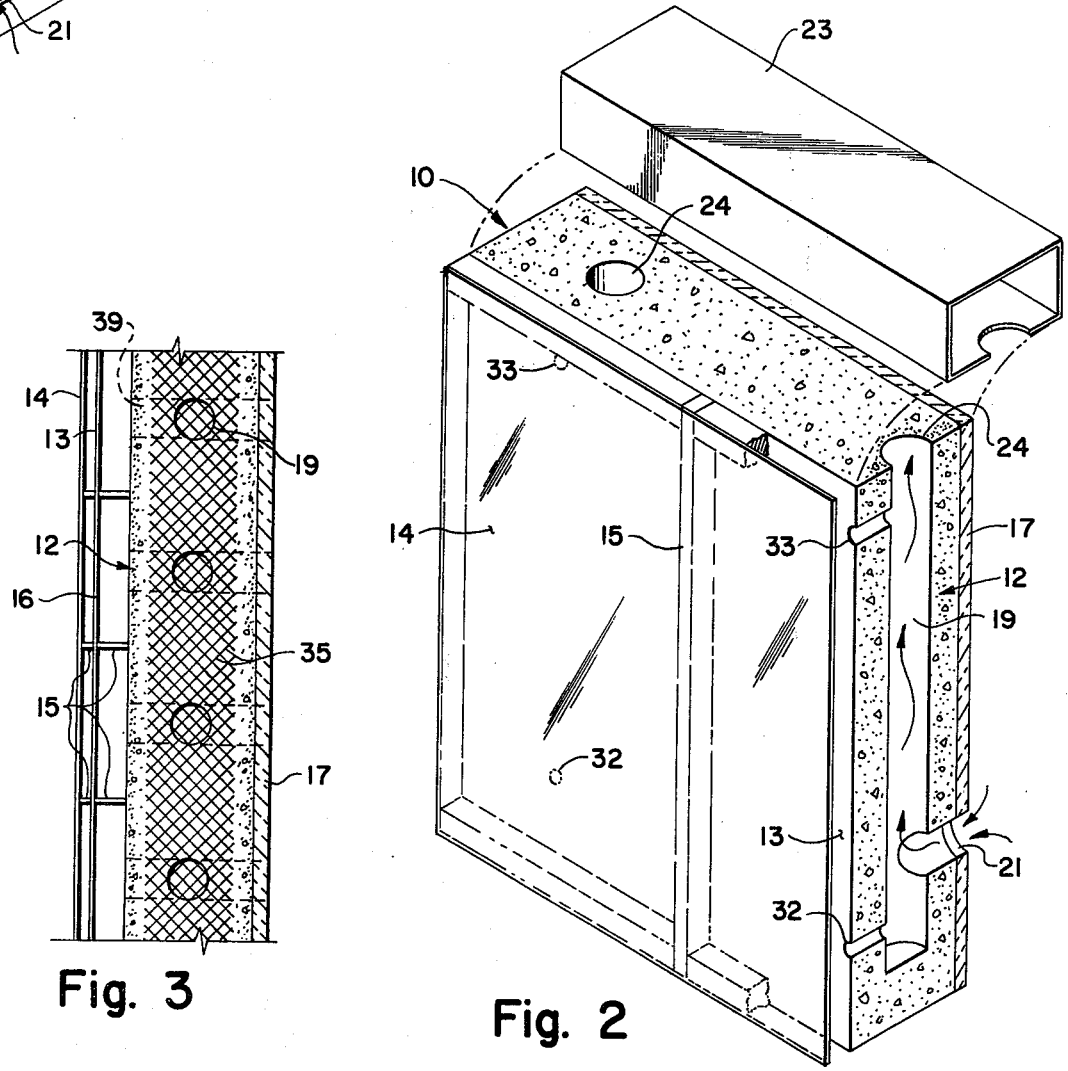
Fig. 3
Fig. 2

METHOD AND STRUCTURE FOR SOLAR HEATING

BACKGROUND OF THE INVENTION

1. Field of the Invention

The present invention relates generally to solar heating systems, and more particularly to an unusually advantageous solar heating system in which heat is collected and supplied to an adjacent cementitious wall through absorption of solar energy utilizing a greenhouse effect, and withdrawn from the wall by means of internal channels defined substantially vertically through the wall, preferably with the aid of heat conducting means disposed through the wall and channel, but not extending to the outer surface of the wall.

2. Description of the Prior Art

The need for greater utilization of solar energy is most apparent. The problems with and drawbacks of systems to utilize solar energy are more subtle. For instance, in the so called active systems, cost is currently an almost overwhelming deterrent. Typical of such systems are those utilizing flat plate collectors, usually roof mounted, with fluid circulating systems to mechanically transfer heat from the flat plate collectors to a remote heat storage system, typically a large pile of stones in the basement, or, alternatively, a large tank of water or salt. Such active systems use energy storage means which run contrary to certain thermodynamic laws, i.e., the heat is collected on the roof and stored in the basement, thereby necessitating additional equipment and energy to mechanically transmit the heat against its natural thermo-siphon flow.

Other solar energy systems are of the so called passive design which is most typically represented by the "Trombe Wall". The Trombe system utilizes a wall of thick masonry contruction and faced with glass or other radiant energy transmitting material spaced away from the wall to accomplish a greenhouse effect. During the day, solar energy is absorbed and transmitted into the wall by conduction into the masonry. Heat is withdrawn from the wall primarily by convection with air flowing from within the building to the space between the outer surface of the wall and transparent facing upward through convection and again into the structure from the top of the wall. A secondary heating mechanism involves radiation from the inner surface of the heated wall. While the Trombe system is most economical in that the masonry wall is usually a structural feature of the building it serves, the drawbacks involve rather rapid loss of heat from the outer surface of the wall through cooling of the transparent panels and by radiation at night. Heated air flows in contact with the cooled inner surface of the transparent panel. Also, when the interior of the building is warm, the Trombe wall tends to overheat the building by radiating heat from the inner surface of the wall.

SUMMARY OF THE INVENTION

The present invention, which provides a heretofore unavailable improvement over previous solar energy utilizing methods and structures, comprises a method and structure in which the advantages of the active and passive systems, i.e., efficiency and low cost respectfully, are maintained while the disadvantages are largely avoided. The method and structure involves a masonry or cementitious wall, which is preferably a load bearing portion of the structure which it serves, having a transparent or translucent panel spaced from but adjacent thereto. An outer surface adjacent or of the wall is of an energy absorbing nature and substantially vertical channels are defined through the interior of the wall. Preferably the rear portion of the wall is insulated to minimize radiation from the wall. Thus, energy is collected in the wall by absorption at the outer surface and flows by convection and/or conduction into the wall. Energy is withdrawn from the wall by passing a fluid, preferably air, through the vertical channels using natural convection or force flow. Thus, the withdrawal of energy is neither uncontrolled nor inefficient. Heat losses and localized cooling at the outer surface of the wall are not critical in that heat is not drawn from that area for utilization during periods involving cooling of the outer surface.

Accordingly, an object of the present invention is to provide a new and improved method and structure for utilizing solar energy which is simple to construct.

Another object of the present invention is to provide a new and improved method and structure for utilizing solar energy which combines the heat utilization efficiency and control of an active system while providing the cost advantages of an inactive system.

Yet another object of the present invention is to provide a new and improved method and structure for utilizing solar energy in which the solar energy is utilized by a conventional heat distribution system.

Still another object of the present invention is to provide a new and improved method and structure for utilizing solar energy in which, in a particularly preferred embodiment, the heat is distributed through and withdrawn from the wall and supply channels by means of heat conducting paths provided at the interior of the wall but not at the outer energy absorbing surface of the wall.

Still yet another object of the present invention is to provide a new and improved method and structure for utilizing solar energy in which a heat pump is employed to substantially extend the amount of stored energy available for practical utilization.

These and other objects and features of the present invention will become apparent from the following description.

BRIEF DESCRIPTION OF THE DRAWINGS

In the Drawing

FIG. 1 is a perspective view of a somewhat simplified solar energy collecting system in accord with the instant invention;

FIG. 2 is a sectioned, perspective view of a heat absorption and storage system in accord with the instant invention;

FIG. 3 is a cross sectional view of a particularly preferred wall structure embodiment of the instant invention;

DETAILED DESCRIPTION OF THE INVENTION

Figure 4:
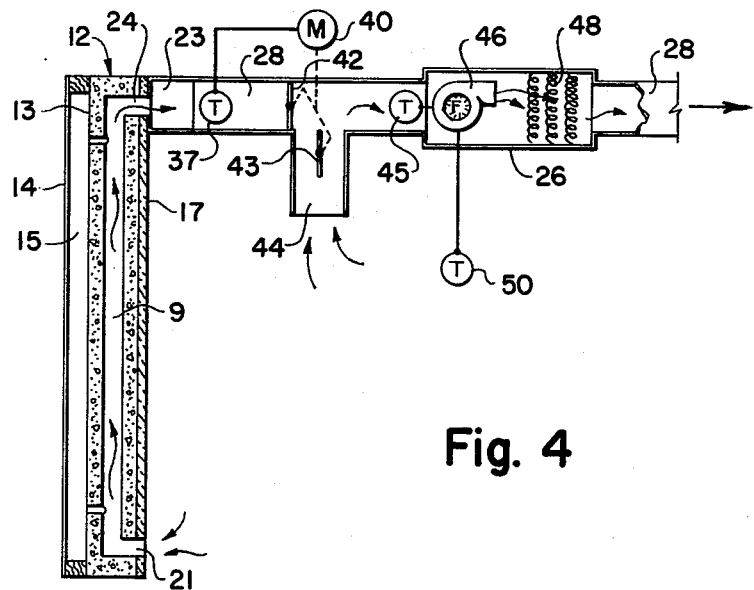
FIG. 4 is a schematic view of a typical simplified system in accord with the instant invention.

Turning now to the drawings, wherein like components are designated by like reference numerals throughout the various figures, a typical structure for utilizing solar energy for building heating is illustrated in FIG. 1 and generally designated by numeral 10. As will be described in more detail hereinafter, structure 10 is configured around cementitious wall 12 (cementitious as used hereinafter is intended to include, for instance, masonry construction, stone, aggregates such as aggregate block contained gravel and poured concrete, etc.). Panels 14 are positioned adjacent to but spaced from the outer surface of wall 12 by, for instance, standoffs 15. As is well known, panels 14 are of a material which is translucent or transparent to relatively short wave, i.e.. ultraviolet radiation as is common in solar energy, but opaque to longer wavelength infrared radiation such as is emitted by the heated surface of wall 12. This well known phenomenon is referred to as the greenhouse effect. Outer surface 13 adjacent to or of wall 12 is provided with an outer coating which absorbs solar energy, preferably by a deep black paint, but optionally may have geometric configurations such as texturing to serve as wavetraps. Insulation 17 is provided at the rear surface of wall 12 to preclude undesirable and uncontrolled radiation of heat from wall 12.

Outer surface 13 may be at the actual surface of wall 12, as in the embodiment of FIG. 2, or at optional, but preferred, collector 16 positioned between wall 12 and panel 14, as in the embodiment of FIGS. 1 and 3. Collector 16 serves to define a convection void between wall 12 and collector 16 and further limits radiation losses from wall 12. The back surface of collector 16 is preferably reflective and also rough, finned or convoluted to improve heat transfer from collector 16 to convection air flowing therebehind.

As shown in FIGS. 1 and 2, channels 19 extend vertically through the central portion of wall 12. Inlets 21 are defined through insulation 17 into the bottom portion of channels 19 and, manifold 23 is provided adjacent the outlets 24 of channels 19. Manifold 23 communicates with fan and/or heater unit 26 which will be explained in more detail below, and through fan and/or heater unit 26 with plenum 28 having ducts 29 and heat outlets 30 connected thereto.

The operation of structure 10 can be, on a rudimentary level, understood from the above description. During the day, solar energy passes through panels 14, is absorbed on outer surface 13 and, primarily through conduction, in the embodiment of FIG. 2, and convection in the embodiment of FIGS. 1 and 3, stored in wall 12. Channels 19 extending through the center of heated wall 12 are subject to natural convection in which air is heated in channels 19 thereby inducing an upward flow with return air passing into inlets 21, up through channels 19 whereat heat is transferred to the air through outlets 24 into manifold 23 and thus, ultimately, to plenum 28 for distribution throughout the desired volume to be heated with the heated air passing through heat outlets 30 and, ultimately, returning to inlets 21. Thus, withdrawal of the stored heat is from the interior of wall 12 thereby avoiding the inefficiencies accruing from withdrawal of heat from the volume defined by panel 14 and outer surface 13 which, at night, is exposed to cold ambient air. In fact, outer surface 13 can cool to ambient conditions without seriously degrading the heat exchange through channels 19. Thus, great efficiencies are accomplished by storing and withdrawing the heat at a location structurally close to but thermodynamically remote from the heat collection portion of the system, i.e., storing the heat at the interior of wall 12 and withdrawing the heat from the interior through channels 19 to avoid involvement of heat collecting outer surface 13 in the heat providing process. Also, since wall 12 is preferably a portion of the building to be heated — though it of course can be free standing if so desired — cost efficiencies are gained over, for instance, flat plate collectors which are entirely add-on units requiring reinforcement of the roof structure carrying them. Similarly wall 12 substantially or entirely replaces the "rock pile" heat storage requirement as well as complicated pumping mechanisms to move heat from the collector to the storage medium.

Other features and refinements of the concept will be apparent from FIGS. 2 and 3. As shown in FIG. 2, lower bleed holes 32 and upper bleed holes 33 are provided between channels 19 and outer surface 13. These holes are relatively small and are provided as a safety measure in the event that the volume between outer surface 13 and panel 14 overheats. Such overheating will provide the energy to induce a convection flow between the subject volume and channel 19, thereby relieving the heat load and remedying the overheating condition and supplementing the heat flow to the interior of wall 12. Preferably, lower hole 32 is spaced upwards from the bottom of outer surface 13 and is of a relatively small diameter to avoid undesirable reverse convection currents during, for instance, night when the ambient temperatures may drop substantially. Alternatively, though not shown, valves openable at a relatively low temperature may be provided at the top of the volume to relieve an overheating condition by venting to the atmosphere.

When collector 16 is employed, openings 38 and 39 are provided to flow air behind collector 16, through opening 39, channel 19 and opening 38, to return again behind collector 16. Thus heat is transferred from collector 16 to wall 12 by convection flow. Of course such air will in some instances intermix with other air from inlet 21 to channel 19 and is not an isolated flow.

Panels 14 may be glass, cast or reinforced plastic, or other such material, but it has been found that a plastic material often provides less of a critical angle for a reflection of energy. Additional panels or other ultraviolet insulating material (not shown) could be interposed between panels 14 and surface 13. Polymeric materials which provide the desired greenhouse effect are readily available. Thus, even when wall 12 is vertical, little radiant heat is rejected when the sun is lower in the sky during cold periods. In fact, vertical arrangement of wall 12 is preferred since little efficiency is lost during cold periods when the sun is relatively low in the sky, but unwanted heat is minimized during warm periods when the sun is higher in the sky. A simple, adjustable overhang (not shown), would also serve to limit exposure of the outer surface 13 during warm periods though, as discussed below, there is substantial need for heat energy even during warm periods to heat water for domestic use, process use, swimming pools, etc.

As illustrated in FIG. 3, a particularly preferred embodiment of wall 12 employs a heat conductive material 35 disposed through the interior of wall 12. Heat conductive material 35, which is preferably a metal and conveniently aluminum in an expanded form analogous to that used as metal lathing for plaster, serves as a heat path through the interior of wall 12. By extending heat conductive material 35 in baffle form across channels 19, better heat transfer from or to a fluid conducted through channel 19 is accomplished. In the interior of wall 12, heat conductive material 35 serves to withdraw heat from the remote portions of wall 12 to channels 19 when heat energy is withdrawn from wall 12, and to more evenly distribute heat energy throughout wall 12 when heat is provided to wall 12. Heat conductive material 35 is preferably disposed in a series of vertically spaced horizontal layers, though this is not critical.

A system somewhat similar to that of FIG. 1 is shown in more detail in FIG. 4. In this system, temperature sensor 37 generates a signal indicative of temperature of the air flow to heater unit 26 from manifold 23. When such air is at a temperature below that of the return air, the signal from sensor 37 causes motor 40 to close damper 42 and open damper 43 from return air bypass 44. Thus air from the building is induced through return air bypass 44 by motor driven fan 46 in heater unit 26, passed over heating element 48, which may be electric coils, a gas burner, or other conventional heat source, and induced to flow into plenum 28 of the heating system. Thermostat 50 is employed to activate fan 46 when heat is required and thermostat 45 activates heating element 48 when fan 46 is running and the airflow induced by fan 46 is blown a pre-selected temperature. It is to be understood that the illustrated arrangement is simplified for convenience. In an actual installation, fan 46 and heating element 48 would be associated with a heating zone with thermostat 50 controlling only the given zone. Other such equipment would service other zones.

In an intermediate situation, the temperature of air from manifold 23 is above that of return air induced through return air bypass 44 but below the preselected temperature for the heating system. In this instance, damper 42 is opened to permit the flow of warmed air from wall 12, and thermostat 45 senses the temperature of such air thereby activating heating element 48 when fan 46 runs. Summarily, temperature sensor 37 admits or precludes the air from manifold 23 as a function of the temperature of such air. Thus, dampers 42 or 43 are appropriately configured to permit either air from manifold 23, or, alternatively, air through return air bypass 44. When heat is desired in the building, thermostat 50 activates fan 46 to induce an air flow as is appropriate from the configurations of dampers 42 and 43. However, if the temperature of the air flow induced by fan 46 is below that required, thermostat 45 activates heater element 48 to insure that plenum 28 receives air at an appropriate pre-selected temperature. While FIG. 4 does not include collector 16, this element could of course be included in the manner shown in FIG. 1.

Figure 5:
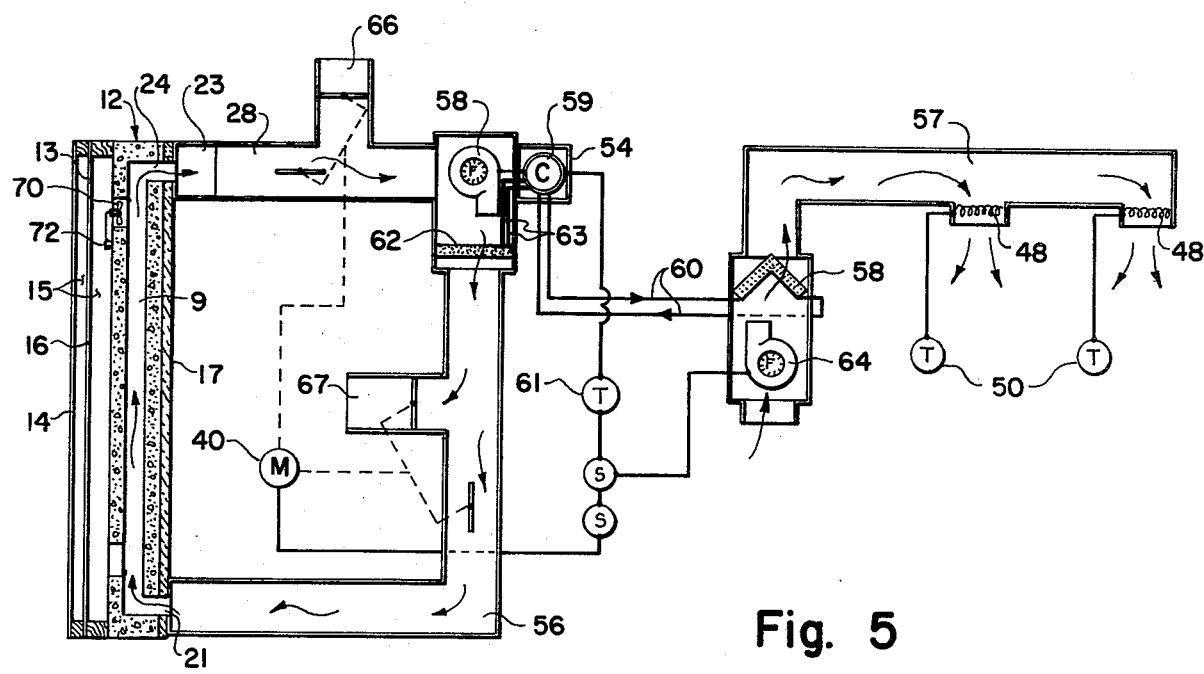
FIG. 5 is a view similar to FIG. 4 in which a heat pump is employed to expand the capabilities of the system in accordance with the instant invention.

In a particularly preferred embodiment as shown in FIG. 5, heat pump 54 is positioned at and between airflow loop 56 which communicates at inlet and outlet ends with wall 12 as described above, and at an intermediate portion includes fan 58 to induce air flow, and duct 57. Heat pump 54 includes coils 58 positioned in duct 57 and connected to compressor 59 by refrigerant lines 60. Thermostat 61 controls the operation of heat pump 54. Accordingly, in the heating mode, warm air from wall 12 is flowed in heat exchange with heated refrigerant at coil 62. Thereafter, the refrigerant flows through line 63 to compressor 59 which compresses and further elevates the temperature of the refrigerant. The refrigerant is then conducted through refrigerant line 60 to coil 58 where, as a result of additional heating through compression, heat is made available to a flow of air induced by fan 64. In the event the available temperatures are such that heat pump 54 is ineffective, i.e., below about 45 to 55° F., zoned heating elements 48 controlled by thermostats 50 are provided in a manner analogous to that described in regard to FIG. 4. Similarly, in the event the outside air is warmer than air available from wall 12, dampers 66 and 67 and valve 68 are repositioned to provide a flow loop which precludes flow through wall 12. This latter flow loop would also be used, for instance, in periods in which interior cooling is desired rather than heating. In that instance, as is well known, heat pump 54 is reconfigured through valving to provide heated refrigerant from compressor section 59 to coil 62 and cooled refrigerant to coil 58.

Summarily, heat pump 54, in the heating mode, is a means of extracting substantially greater amounts of heat from wall 12 during periods in which the solar energy available to wall 12 tends to be less than that withdrawn for heating purposes. In addition to making greater amounts of heat available from wall 12 with relatively modest energy requirements, heat pump 54 also also provides for a more constant energy demand as opposed to the peaking periods resulting when heating elements 48 are electrical heating coils. Though not a direct aspect of the instant invention, heat pump 54 of course also serves to provide air conditioning during appropriate seasons. If desired, the convecting flow behind collector 16 could be aided by blower 70 controlled by thermostat 72. Blower 70 would prevent overheating of the void between wall 12 and collector 16.

Summarily, the instant invention provides for a structure which is configured to absorb solar energy at a surface thereof, conduct the energy to the interior portion of an adjacent wall, preferably with the aid of a heat conducting material embodied in the wall but spaced from the outer surface of the wall. Channels are defined in the interior of the wall to permit circulation of a fluid, preferably air, to withdraw heat from the wall when required. The heat from the channels is conducted through a manifold to a conventional forced air or other heating system with, preferably, an optional heating element in this system to supplement the heat available from the wall. Alternatively, instead of air passages through the wall, a labyrinth of water pipes could be encased in the wall and connected to conventional radiant heaters through a conventional pump and having as a standby heat source a boiler to supply additional heat into the system when adequate heat is not available from the wall. Such a liquid heat transfer system could also be used concurrently with the air flow system to provide for heating or preheating of hot water for domestic use, etc. These latter uses conserve energy from other sources during periods when space heating is not required.

In a particularly preferred embodiment, a heat pump is employed to interact with the heated fluid available from the wall. In this manner, the temperature of the wall may fall to 50 or 60° F. while still providing heat to the interior of the building at quite favorable energy costs. Thus substantially more energy is available from the wall and, after the period of solar energy shortage, i.e., a cloudy period, the wall will be somewhat more efficient in receiving solar energy.

Of course, it is preferred that the wall be utilized as a structural portion of the building. However, in appropriate circumstances, a free standing wall is within the purview of the concept. In appropriate types of construction, the wall may actually be incorporated into the roof portion of the building, or other such building portions rather than strictly serving as a wall. Similarly, the wall need not be flat. As used herein, the term "wall" is intended to encompass various such other arrangements and combinations which involve the heat collection and storage functions described above.

Although only limited embodiments of the present invention have been illustrated and described, it is anticipated that various changes and modifications will be apparent to those skilled in the art and that such changes may be made without departing from the scope of the invention as defined by the following claims.

What is claimed is:

1. A radiant energy collection and storage system comprising;
    a cementitious wall of a thickness sufficient to be self supporting;
    at least one channel defined in and extending through the interior of the wall in a direction having a predominantly vertical component;
    a panel substantially opaque to infrared radiation but at least translucent to ultraviolet radiation mounted spaced from but adjacent to an outer surface of the cementitious wall with the panel being connected to the wall to define a substantially closed volume;
    a solid radiant energy absorbing surface of substantially the same size as the panel positioned within the volume defined by the panel and the adjacent surface of the cementitious wall;
    an inlet opening defined in the wall and communicating with at least one channel;
    an outlet opening defined in the wall and communicating with the same channel as does the inlet opening;
    conduit means connected to the outlet opening; and
    spaced openings communicating between at least one channel and the surface of the wall adjacent the panel, one such spaced opening being positioned at an upper portion of the wall and another such spaced opening being positioned at a lower portion of the wall;
    whereby radiant energy may be collected at the radiant energy absorbing surface and conducted as sensible heat into the cementitious wall for storage or alternatively conducted from the wall by fluid flow through the channel and into the conduit means.

2. A radiant energy storage and collection system as set forth in claim 1 in which the surface of the wall opposite that adjacent the panel is provided with an insulating coating.

3. A radiant energy storage and collection system as set forth in claim 1 in which heat flow means are disposed within the wall extending transversely across at least one channel.

4. A radiant energy storage and collection system as set forth in claim 3 in which the heat flow means is a foraminous sheet of aluminum extending into the cementitious walls and extending across at least one channel whereby the aluminum material provides a low resistance heat flow path into and out of the wall and the openings in the sheet provide for contact with the fluid flowing through said channel.

5. A radiant energy storage and collection system as set forth in claim 1 in which a powered fan is positioned at the opening defined at the upper portion of the wall.

6. A radiant energy storage and collection system as set forth in claim 1 in which the radiant energy absorbing surface is in the form of a collector positioned between the panel and the adjacent surface of the wall and forming a first closed volume in conjunction with the panel and a second closed volume in conjunction with the wall.

7. A radiant energy storage and collection system as set forth in claim 1 in which the radiant energy absorbing surface is provided on the surface of the wall adjacent the panel.

8. A radiant energy and storage collection system as set forth in claim 1 in which the conduit means communicates with a substantially closed volume to be heated and the inlet opening also communicates with such volume.

9. A radiant energy collection and storage system as set forth in claim 8 in which auxiliary heating means are provided in the conduit means and a blower is also provided in the conduit means, whereby supplemental heat may be provided to the fluid in the form of airflow through the conduit means and the air flow at least partially induced by the blower means.

10. A radiant energy collection and storage system as set forth in claim 9 in which valve means are provided in the conduit means between the outlet opening from the wall and the blower, the valve means including gates adapted to selectively vent the conduit means to the closed volume while isolating the outlet opening in one position and to close the conduit means vent to the closed volume while opening the conduit means to the outlet opening in the wall in the other position.

11. A radiant energy collection and storage system as set forth in claim 1 in which the conduit means forms a substantially continuous loop between the outlet opening and the inlet opening in the wall, and further including a heat pump having a first heat exchanger disposed in the conduit means, and second conduit means having a second heat exchanger connected to the heat pump disposed therein, whereby the heat pump may be employed to withdraw heat energy from the first heat exchanger at a temperature substantially below that at which the heat energy is provided to the second heat exchanger thus permitting withdrawal of heat from the wall below temperatures at which the heat is supplied elsewhere.

12. A radiant energy collection and storage system as set forth in claim 11 in which first and second valve means are provided upstream and downstream of the first heat exchanger, the valve means being interconnected to selectively connect the conduit means to the wall inlet opening and the wall outlet opening in a first configuration, and to alternatively isolate the first heat exchanger from the inlet and outlet openings while concurrently venting the conduit means at each valve means in a second configuration.

13. A radiant energy collection and storage system comprising;
    a substantially vertical self supporting cementitious wall;
    a plurality of substantially vertical channels defined in the interior of the wall;
    at least one panel substantially opaque to radiation in the infrared radiation and longer wavelength range but at least translucent to radiation ultraviolet and shorter wavelength range mounted adjacent an outer surface of the cementitious wall but spaced therefrom;
    a solid collector positioned between the outer surface of the wall and the panel and defining a first substantially closed volume with the panel and being sealingly connected to the adjacent wall to define a second substantially closed volume;

a radiant energy absorbing surface on the surface of the collector adjacent the panel;

a plurality of inlet openings defined in the wall at a lower portion thereof with an inlet opening communicating with each channel;

a plurality of outlet openings defined in the wall at an upper portion thereof with an outlet opening communicating with each channel;

spaced openings provided between a channel at upper and lower portions thereof and the second closed volume defined by the collector and the outer surface of the wall; and conduit means connected to the outlet opening.

14. A radiant energy collection and storage system as set forth in claim 13 in which power blower means are provided at each upper opening between the outer surface of the wall and the channel.

15. A method of collecting and storing radiant energy comprising;

absorbing radiant energy at a radiant energy absorbing collector adjacent to but spaced from a cementitious wall to produce sensible heat;

transferring the sensible heat produced by absorbing the radiant energy into the adjacent cementitious wall by convection by flowing air to and from the confined volume defined by the collector and the adjacent cementitious wall, through openings communicating with the channels, and through the channels;

inducing a flow of fluid through channels defined through the interior of the cementitious wall;

heating the fluid induced through the channels from the sensible heat transferred into the cementitous wall; and flowing the fluid to a desired location spaced from the wall.

16. A method of collecting and storing radiant energy as aet forth in claim 15 further including the steps of flowing the liquid from the channels through a contact, contacting the fluid with a first heat exchanger, flowing the fluid from the heat exchanger, conducting heat from the heat exchanger to a heat pump, and providing heat at a second heat exchanger from the heat pump.

* * * * *